US005594283A

United States Patent [19]

Bartel et al.

[11] Patent Number: 5,594,283

[45] Date of Patent: Jan. 14, 1997

[54] LOCK SYSTEM FOR MOTOR VEHICLE WITH SLIDING DOOR

[75] Inventors: Peter Bartel, Hattingen; Frank Kleefeldt, Heiligenhaus, both of Germany

[73] Assignee: Kiekert Aktiengesellschaft, Heiligenhaus, Germany

[21] Appl. No.: 437,894

[22] Filed: May 10, 1995

[30] Foreign Application Priority Data

May 11, 1994 [DE] Germany .......................... 44 16 642.7

[51] Int. Cl.[6] .......................................... H02P 3/00

[52] U.S. Cl. .......................... 307/10.1; 307/9.1; 70/275; 70/278; 70/264; 318/469; 180/289

[58] Field of Search .................................... 307/9.1, 10.1; 70/275, 277, 278, 279, 262, 263, 264; 318/266, 267, 286, 466, 467, 468; 180/289

[56] References Cited

U.S. PATENT DOCUMENTS 4,468,596 8/1984 Kinzl et al. .......................... 318/287
5,185,562 2/1993 Huyer .................................. 318/466
5,194,756 3/1993 Darbesio ............................. 307/10.2
5,204,592 8/1993 Huyer .................................. 318/466
5,250,894 10/1993 Periou ................................ 307/10.1
5,334,876 8/1994 Washeleski et al. ................. 307/10.1

*Primary Examiner*—William M. Shoop, Jr.
*Assistant Examiner*—Peter Ganjoo
*Attorney, Agent, or Firm*—Herbert Dubno; Andrew Wilford

[57] ABSTRACT

A motor vehicle having a plurality of pivotal doors and a sliding door each movable between a closed and an open position has a lock system with a respective lock on each of the doors having an electrical motor energizable to set the respective lock in a locked position and in an unlocked position. A sensor at the sliding door produces a closed-door output when the sliding door is closed and an open-door output when the sliding door is open. Contacts on the sliding door are connected to the respective motor and contacts on the vehicle are engageable with the sliding-door contacts only in the closed position of the sliding door. A command unit can generate a lock-doors output and an unlock-doors output and an electrical controller is connected to the sensor, to the command unit, to the pivotal-door motors, and to the motor-vehicle contacts for energizing the pivotal-door motors to place the pivotal-door locks in the locked position after generation of the lock-doors signal. The controller energizes the pivotal-door motors to place the pivotal-door locks in the unlocked position after generation of the unlock-doors signal and it energizes the sliding-door motor via the contacts to place the sliding-door lock in the locked position after generation of the lock-doors signal and of the closed-door output by the sensor.

6 Claims, 3 Drawing Sheets

LOCK SYSTEM FOR MOTOR VEHICLE WITH SLIDING DOOR

FIELD OF THE INVENTION

The present invention relates to a motor-vehicle lock system. More particularly this invention concerns a lock system for a motor vehicle having a plurality of doors at least one of which slides.

BACKGROUND OF THE INVENTION

A standard central lock system for a motor vehicle with a plurality of doors has a respective lock in each door provided with a respective actuator, typically a small electric motor, by means of which the lock can be displaced between a locked and unlocked position. In some vehicles a third antitheft position is provided that not only maintains the respective door locked, but also prevents it from being opened from inside the vehicle or even from outside by a key so that only a specially bitted key fitted to the driver's door lock can open the vehicle.

Normally a central controller is connected via cables to the various door locks and even to sensors that report back to the controller on the open/closed position of the door. For the standard pivotal door the cabling passes from the door post into the door adjacent the hinge so that this cabling is relatively safe and is only subjected to modest flexing as the door swings open and closed.

A sliding door of the type provided on many vans presents a particular problem in that the entire door moves rather radically, often through a substantial distance, relative to the door posts it mates with. The lock is, nonetheless, still mounted in this door so the cabling must be routed in such a manner that it can follow the door movement without kinking or getting damaged. Clearly this constitutes a substantial design problem and creates something that is likely to fail, creating warranty and callback problems for the vehicle manufacturer.

OBJECTS OF THE INVENTION

It is therefore an object of the present invention to provide an improved lock system for a vehicle with a sliding door.

Another object is the provision of such an improved lock system for a vehicle with a sliding door which overcomes the above-given disadvantages, that is which has a trouble-free and relatively simple system for powering the lock in the door.

SUMMARY OF THE INVENTION

A motor vehicle having a plurality of pivotal doors and a sliding door each movable between a closed and an open position has a lock system with a respective lock on each of the doors having an electrical motor energizable to set the respective lock in a locked position and in an unlocked position. A sensor at the sliding door produces a closed-door output when the sliding door is closed and an open-door output when the sliding door is open. Contacts on the sliding door are connected to the respective motor and contacts on the vehicle are engageable with the sliding-door contacts only in the closed position of the sliding door. A command unit can generate a lock-doors output and an unlock-doors output and an electrical controller is connected to the sensor, to the command unit, to the pivotal-door motors, and to the motor-vehicle contacts for energizing the pivotal-door motors to place the pivotal-door locks in the locked position after generation of the lock-doors signal. The controller energizes the pivotal-door motors to place the pivotal-door locks in the unlocked position after generation of the unlock-doors signal and it energizes the sliding-door motor via the contacts to place the sliding-door lock in the locked position after generation of the lock-doors signal and of the closed-door output by the sensor.

Thus with this system there is no permanent cabling or wiring from the motor vehicle to the sliding-door lock. Instead when the sliding door is closed the contacts mate and the sliding-door lock is connected to the controller. To prevent the controller from attempting to set the locks in the locked position when the sliding-door lock is not closed, the sensor is provided to block this type of action.

According to the invention the electric controller includes a memory circuit for storing the lock-doors and unlock-doors outputs. The controller is set up to erase the closed-door output from the memory circuit when the open-door output is generated by the sensor.

According to another feature of the invention the controller only energizes the pivotal-door motors to place the pivotal-door locks in the locked position after generation of the lock-doors signal and after generation of the closed-door signal by the sensor. Thus none of the doors will be locked until the slider is closed. Alternately the pivotal doors can be locked immediately on generation of the lock-doors output, but the controller will wait until the slider is closed to lock it.

The sensor according to the invention includes a pair of terminals on the motor vehicle connected to the controller, a pair of terminals on the sliding door engageable with the motor-vehicle terminals only in the closed position of the sliding door, and a shunt bridging and shorting out the sliding-door terminals so that the motor-vehicle terminals are shorted out via the sliding-door terminals when the sliding door is in the closed position. Thus when the slider is closed, the terminals are bridged and the controller receives the closed-door signal. This is a very simple system that ensures that when the central locking is actuated all doors are in fact locked. The sliding-door motor is wholly disconnected when the sliding door is in the open position. Alternately a magnetic sensor could be used, or one using a photocell system.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
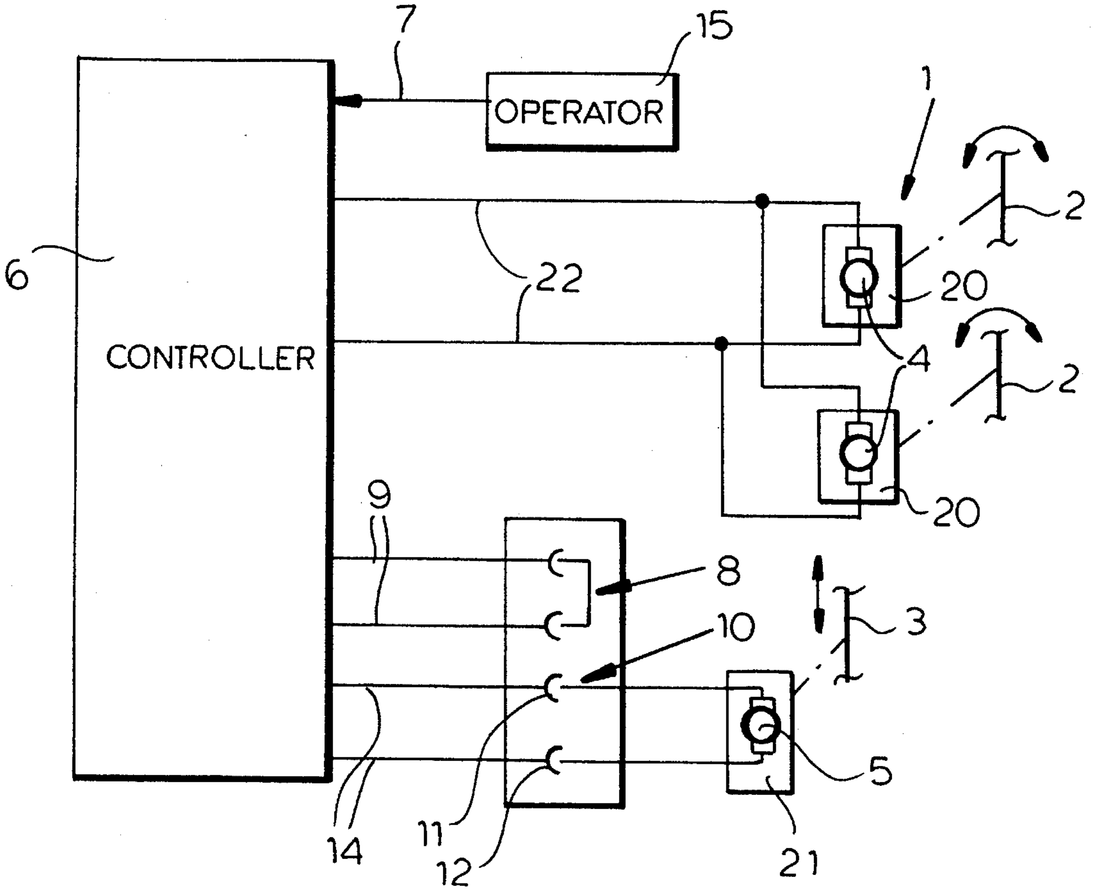
FIGS. 1 and 2 are schematic diagrams illustrating motor-vehicle lock systems according to the invention.

As seen in FIG. 1 a lock system according to this invention is for use on a motor vehicle having a plurality of standard pivotal doors 2 provided with locks 20 having respective motors 4 and a sliding door 3 having a latch 21 with a motor 5. A command element or operator 15, typically a key-operated driver's door lock, is connected at 7 to a main controller or command module 6 that is in turn connected to the motors 4 and 5 via cabling 22 and 14. The cabling 22 is permanently connected between the controller 6 and the locks 20.

The slider 3 is provided with a sensor 8 that is connected via wiring 9 to the controller 6 to provide an output indicating whether the slider 3 is open or closed. As illustrated this is accomplished by providing a jumper on the door 3 that fits into terminals on the door post when the door is closed, but could be a reed switch actuated by a magnet or the like. In addition the motor 5 is fed electricity from contacts 11 and 12 on the door post connected via the cabling 14 to the controller 6. The motor 5 has terminals 10 that fit with the contacts 11 and 12 only in the closed position of the door 3. Thus only in the closed position of the door 3 is the lock 21 connected to the controller 6 and is operable thereby. When the door 3 is open the latch 21 is disconnected from the central controller 6 and cannot be actuated by it.

The information from the sensor 8 whether the door 3 is open or closed can be retained in the controller 6 and erased from it when the sensor 8 indicates to the controller 6 that the door 3 has been opened. Similarly the controller 6 can store signals from the operator 15 regarding whether the lock 21 should be locked or unlocked to execute these commands when the door 3 moves from the open to the closed position or vice versa.

Figure 2:
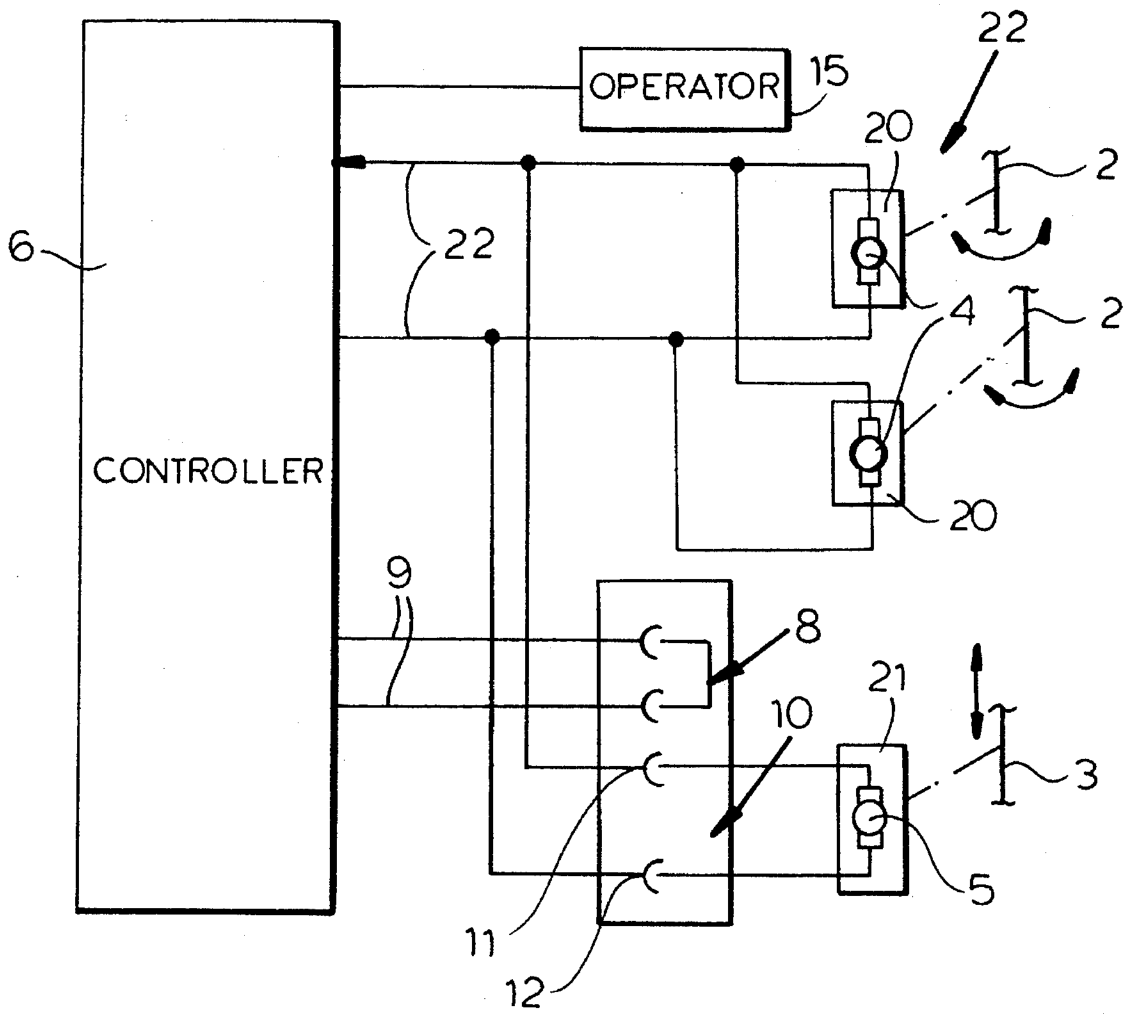

In FIG. 2 the terminals 11 and 12 are connected to the wiring 22 for the motors 4 instead of via separate wires 14 to the controller 6 for actuation in parallel with these motors 4. In this arrangement the command to put all the locks 4 and 5 into the locked position is only issued when the sensor 8 indicates to the controller 6 that the door 3 is closed.

Figure 3:
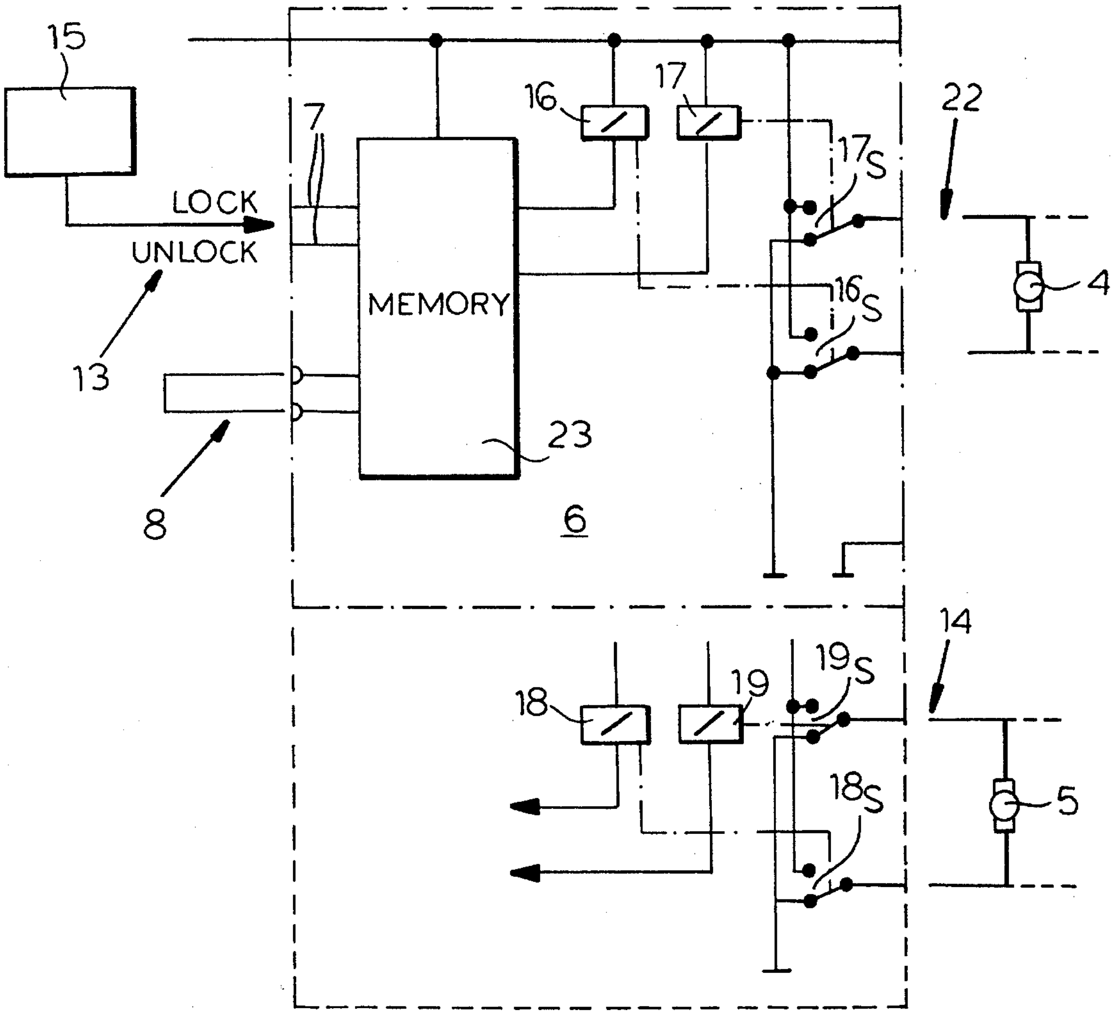
FIG. 3 is a schematic diagram illustrating a detail of the lock system.

FIG. 3 shows how the controller 6 includes a memory 23 which receives and stores inputs from the operator 15 and sensor 8 and which is connected to opening and closing relays 16 and 17 for each of the motors 4 and opening and closing relays 18 and 19 for the motor 5. The relays 16, 17, 18, and 19 have contacts **16*s*, 17*s*, 18*s*, and 19*s***.

The system of FIG. 1 operates as follows:

When the operator 15 generates a lock-door command signal to lock the doors 2 and 3, the controller 6 normally immediately energizes the motors 4 via the wiring 22 to move the latches 20 into the locked position, as is standard. If the sensor contacts 8 report via the wiring 9 that the door 3 is also closed, the motor 5 is similarly energized via the wiring 14 and contacts 10–12 to set the lock 21 in the locked position.

If, however, the sensor 8 is generating the open-door signal indicating that the door 3 has not been closed, the memory 23 stores the lock-door signal from the command operator 15 and, when the door 3 is finally closed and the sensor 8 reports this, the motor 5 is energized to set the lock 21 of the door 3 in the locked position.

Thus the doors 2 and 3 can only be all locked when the door 3 is closed. Thus they can be unlocked simultaneously, since the sensor 8 will be reporting a door-locked condition to the controller 6.

In the arrangement of FIG. 2 the controller 6 does not operate any of the motors 4 and 5 until the sensor 8 reports that the door 8 has been closed. Thus locking of all the doors 2 and 3 is delayed until this door 3 is shut. Then the signal held in the memory 23 is passed to the motors 4 and 5 to lock them all simultaneously.

We claim:

1. In a motor vehicle having a plurality of pivotal doors and a sliding door each movable between a closed and an open position, a lock system comprising:

a respective lock on each of the doors having an electrical motor energizable to set the respective lock in a locked position and in an unlocked position;

sensor means at the sliding door for generating a closed-door output while the sliding door is closed and an open-door output while the sliding door is open;

contacts mounted directly on the sliding door and connected to the respective motor;

contacts mounted directly on the vehicle and engageable with the sliding-door contacts only in the closed position of the sliding door;

command means for generating a lock-doors output and an unlock-doors output; and electrical control means connected to the sensor means, to the command means, to the pivotal-door motors, and to the motor-vehicle contacts for energizing the pivotal-door motors to place the pivotal-door locks in the locked position after generation of the lock-doors signal, energizing the pivotal-door motors to place the pivotal-door locks in the unlocked position after generation of the unlock-doors signal, and energizing the sliding-door motor via the sliding-door contacts to place the sliding-door lock in the locked position after generation of the lock-doors signal and during generation of the closed-door output by the sensor means.

2. The motor-vehicle lock system defined in claim 1 wherein the electric control means includes a memory circuit for storing the lock-doors and unlock-doors outputs.

3. The motor-vehicle lock system defined in claim 2 wherein the control means includes means for erasing the closed-door output from the memory circuit when the open-door output is generated by the sensor means.

4. The motor-vehicle lock system defined in claim 1 wherein the control means only energizes the pivotal-door motors to place the pivotal-door locks in the locked position after generation of the lock-doors signal and during generation of the closed-door signal by the sensor means.

5. In a motor vehicle having a plurality of pivotal doors and a sliding door each movable between a closed and an open position, a lock system comprising:

respective lock on each of the doors having an electrical motor energizable to set the respective lock in a locked position and in an unlocked position;

sensor means at the sliding door including a pair of terminals on the motor vehicle, a pair of terminals on the sliding door engageable with the motor-vehicle terminals only in the closed position of the sliding door, and a shunt bridging and shorting out the sliding-door terminals, whereby the motor-vehicle terminals are shorted out via the sliding-door terminals when the sliding door is in the closed position for generating a closed-door output while the sliding door is closed and an open-door output while the sliding door is open;

contacts mounted directly on the sliding door and connected to the respective motor:

contacts mounted directly on the vehicle and engageable with the sliding-door contacts only in the closed position of the sliding door;

command means for generating a lock-doors output and an unlock-doors output; and electrical control means connected to the terminals on the motor vehicle, to the command means, to the pivotal-door motors, and to the motor-vehicle contacts for energizing the pivotal-door motors to place the pivotal-door locks in the locked position after generation of the lock-doors signal, energizing the pivotal-door motors to place the pivotal-door locks in the unlocked position after generation of the unlock-doors signal, and energizing the sliding-door motor via the sliding-door contacts to place the sliding-door lock in the locked position after generation of the lock-doors signal and during generation of the closed-door output by the sensor means.

6. In a motor vehicle having a plurality of pivotal doors and a sliding door each movable between a closed and an open position, a lock system comprising:

a respective lock on each of the doors having an electrical motor energizable to set the respective lock in a locked position and in an unlocked position;

sensor means at the sliding door for generating a closed-door output when the sliding door is closed and an open-door output when the sliding door is open;

contacts fixed on the sliding door connected to the respective motor;

contacts fixed on the vehicle engageable with the sliding-door contacts only in the closed position of the sliding door, the sliding-door motor being wholly disconnected when the sliding door is in the open position; and electrical control means connected to the sensor means, to the command means, to the pivotal-door motors, and to the motor-vehicle contacts for energizing the motors to place the respective locks in the locked position after generation of the lock-doors signal and of the closed-door output by the sensor means.

* * * * *